United States Patent [19]

Raman et al.

[11] 4,405,535

[45] Sep. 20, 1983

[54] PREPARATION OF RAPIDLY SOLIDIFIED PARTICULATES

[75] Inventors: Ramaswamy V. Raman, Columbus; Robert E. Maringer, Worthington, both of Ohio

[73] Assignee: Battelle Memorial Institute, Columbus, Ohio

[21] Appl. No.: 316,004

[22] Filed: Oct. 29, 1981

Related U.S. Application Data

[63] Continuation of Ser. No. 163,908, Jun. 27, 1980, abandoned.

[51] Int. Cl.$^3$ .............................................. B01J 2/06
[52] U.S. Cl. ...................................... 264/11; 264/13
[58] Field of Search .................................. 264/11, 13

[56] References Cited

U.S. PATENT DOCUMENTS 1,886,285  11/1932  Martin .................................... 264/11
3,845,805  11/1974  Kavesh ................................. 264/180

FOREIGN PATENT DOCUMENTS 1224125  9/1966  Fed. Rep. of Germany .

*Primary Examiner*—James R. Hall
*Attorney, Agent, or Firm*—Kenneth R. Warburton

[57] ABSTRACT

Normally solid materials, e.g. metals or metal alloys, are provided as solid particulates, and preferably as fine spherical to almost spherical, as well as fiber-like, particulates, including solid particulates of a metallic glassy structure, by contacting a molten stream of the material, which at a temperature within 25 percent of its equilibrium melting point °K. has a surface tension of 10 to 2500 dynes/cm. and a viscosity of 0.001 to 1 poise, preferably from 10° C. to 100° C. above its melting point, with a rapidly moving wall of a centrifugally disposed rotating liquid quench fluid, e.g. water or an oil, etc., in a manner adapted to disrupt the stream with breaking of the stream into molten globules or particles and to quench rapidly those globules or particles into the solid particulates. The produced solid particulates subsequently are separated from the liquid quench fluid and classified to find utility for example in powder metallurgical applications.

21 Claims, 2 Drawing Figures

PREPARATION OF RAPIDLY SOLIDIFIED PARTICULATES

This application is a continuation of application Ser. No. 163,908, filed June 27, 1980, and now abandoned.

TECHNICAL FIELD

This invention relates to a preparation of rapidly solidified particulates. More particularly, the invention concerns a method of making solid particulates through contacting a molten stream of material with a centrifugally disposed rotating liquid quenching fluid so as to disrupt (subdivide) the molten stream into particulates and rapidly quench the particulates, and then subsequently recovering quenched solid particulates from the quenching fluid.

BACKGROUND

P. Duwez et al. (J. Appl. Phys. 31, p 1136–37 (1960)) teaches a propelling of a small liquid metal alloy droplet against the target of the inside surface of a high speed rotating cylinder at a suitable angle with centrifugal force acting on the contacting droplet to insure good thermal contact with the target with a large over-all heat transfer rate and to spread the droplet into a thinner layer of solidified material. R. Pond, Jr. et al. (Trans. Met. Soc. AIME Vol. 245, p. 2475–2476, Nov. 1969) discloses casting of metallic fiber by forcing a stream of molten alloy through an orifice onto the inside surface of a spinning drum with the drum's radial acceleration inducing good thermal contact and a spreading of the contacting stream into a flat filament prior to complete solidification.

J. T. Gow (U.S. Pat. No. 2,439,772) uses a revolving container containing a cooling or quenching liquid which from the revolving is formed into an annular vertical wall of revolving liquid into which are thrown globules of molten metal at a substantially normal path thereto to penetrate the liquid rather than glance off. In this process Gow discharges a molten material (e.g. steel) stream into a rotating dish-shaped receptacle to throw metal from its periphery as the small globules being thrown into the annular vertical wall of revolving liquid. Gow in discussion of the prior art also mentions disintegrating molten metal in the form of a stream into droplets by means of impacting the molten metal stream with high pressure steam or water and another method of rapidly rotating drum or paddle wheels hitting a metal stream to throw or bat globules therefrom. T. Yamaguchi et al. (Appl. Phys. Lett. 33(5), Sept. 1, 1978, p. 468–470) teaches preparation of amorphous powder by a water atomization technique in which molten alloy is introduced into the intersection of a pair of high velocity water jets. B. Haak (U.S. Pat. No. 1,782,038) converts salts into globular bodies through a melt being poured onto a rotating disc which throws therefrom droplets towards the walls of a vessel containing a rotating liquid the level of which is higher than the rotating disc by means of intense rotation by a stirrer.

G. R. Leghorn (U.S. Pat. No. 3,430,680) discloses a casting method for selected metal shapes involving flowing a stream of molten metal in heat-transfer contact with one or more streams of cooling liquid mold material flowing in the same direction. For continuous castings the flows of liquid mold material and molten casting metal are synchronized. For tapering and for discrete lengths of the cast shapes there are used differential flows, such as faster flowing mold material to create shearing action at the interfaces of molten casting metal with the flowing mold material. Discrete droplet or spherical castings are shown from breakup of the introduced metal stream by vibration means, such as illustrated by the FIG. 17 embodiment, or by introducing uniform accurately weighed solid particles, such as illustrated by the FIG. 18 embodiment. J. L. Engelke et al. (U.S. Pat. No. 3,347,959) also teaches casting of molten metal within a continously flowing stream of liquid as the mold flowing in the same direction so as to form wire. By maintaining the velocity of the mold stream greater than the wire-forming molten filament, the diameter of the filament is reduced by the action of viscous shear forces at the liquid-liquid interface.

S. Kavesh (U.S. Pat. No. 3,845,805) discloses providing metal filaments by a process involving rapid solification of a molten jet in a fluid medium. This process involves forming a free jet of the molten material in a gaseous or evacuated environment, traversal of the free jet through an interface into the fluid medium which is flowing concurrently with and at essentially the same velocity as the jet, and recovering solidified filament. In Col. 7 in discussing factors of temperature of the molten jet and molten jet velocity in relation to fluid velocity in a standpipe, mention is made that "If discontinuous filaments with tapered ends are formed, it is an indication that jet velocity is substantially less than the fluid velocity in the standpipe." and "pearl necklace appearance of the filament . . . may be obtained when the molten jet is superheated, e.g. about 250° C. above its melting point". In Example 7 a molten jet of copper was disrupted and solidified as discrete spheroidal particles in a sodium chloride brine quench fluid in contrast to obtaining filaments in a more rapid quenching magnesium brine quench fluid in the preceding example.

SUMMARY DISCLOSURE OF INVENTION

The process of the invention involves contacting a centrifugally disposed rotating quenching fluid with an unbroken coherent molten stream of solidifiable material, e.g. metal, so as to disrupt (subdivide) the stream into particulates and to rapidly quench the particulates to solids. The particulate solids subsequently are recovered from the quenching fluid.

BRIEF DESCRIPTION OF THE DRAWINGS

Details of the invention are discussed in connection with the accompanying drawings of which.

MORE DETAILED DESCRIPTION OF THE DRAWINGS

Figure 1:
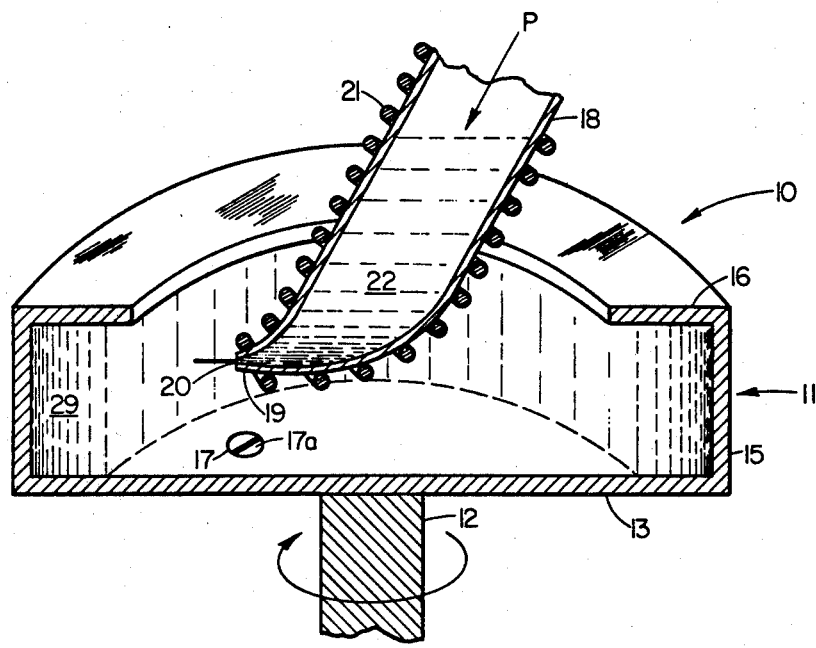
FIG. 1 is a perspective view partially in vertical cross-section and partially illustrated diagramatically of a simplified form of apparatus for carrying forth the method of the invention.
Figure 2:
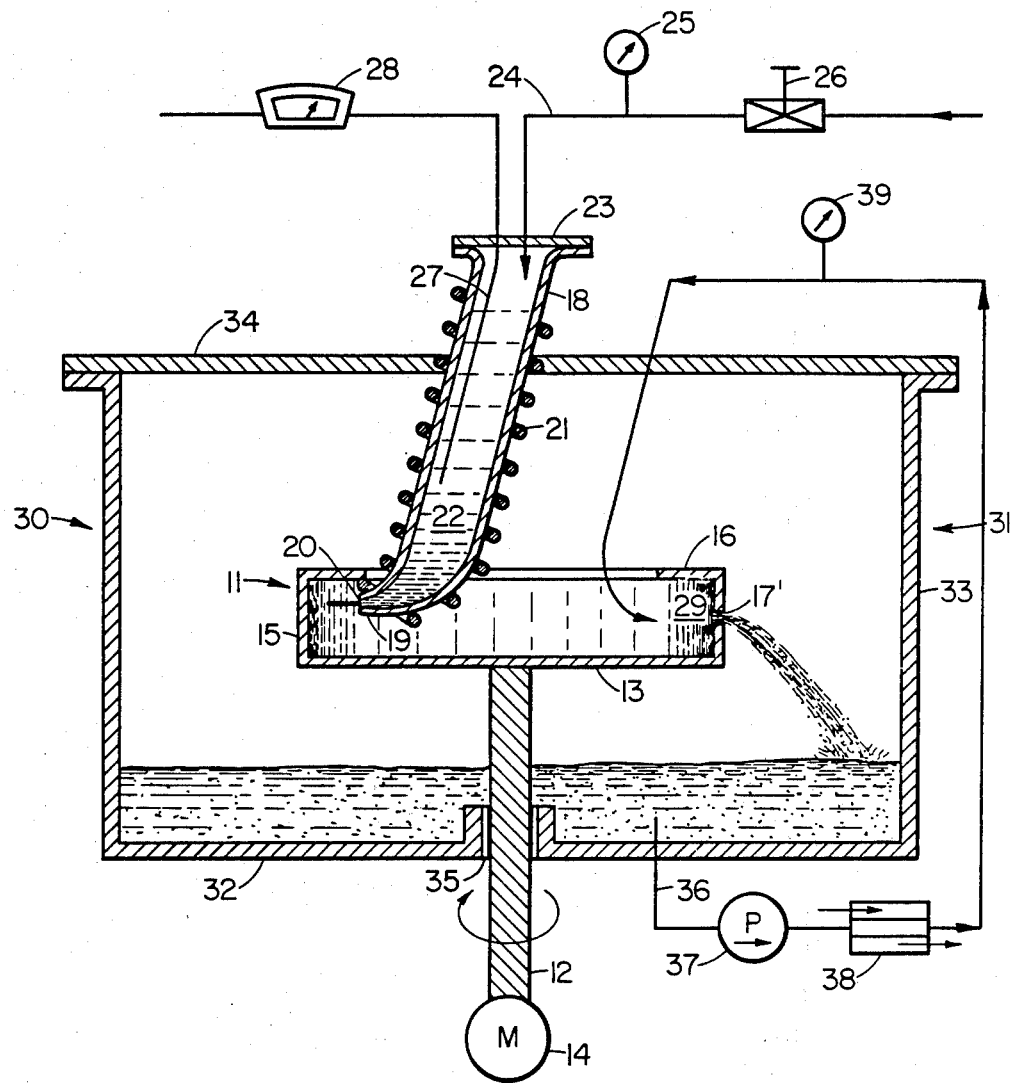
FIG. 2 is a partially vertical cross-sectional view illustrated also in part diagramatically of an alternative form of apparatus for carrying forth the method of the invention.

Referring to the drawings in which in each illustrated drawing figure the same identifying numeral is used to identify and refer to the same or equivalent element and component, the FIG. 1 illustrated apparatus is generally designated 10 and the FIG. 2 apparatus is generally designated 30.

Apparatus 10 includes a cup-shaped element, generally designated 11, which has a shaft 12 centrally affixed by conventional means to a bottom section 13 of cup-shaped element 11. Shaft 12 is rotatable at any of a variety of chosen constant speeds by a conventional motor means 14 which means is not shown in FIG. 1 and is illustrated diagramatically in FIG. 2. Bottom section 13 at its outer periphery merges into an upwardly projecting cylindrical side wall 15 which at its uppermost height turns inward for a short distance to form a top rim 16. Located in bottom section 13 is a small hole or opening 17 therethrough for purposes described later. In FIG. 1 the opening 17 in section 13 has been closed by a removable threaded machine screw 17a.

In the opening encircled by top rim 16 there is located and extends downward a vessel 18 of appropriate inert heat-resistant material and generally cylindrical, which near a lowermost point has been provided with a tip 19 containing an orifice opening 20 directed towards side wall 15. Surrounding vessel 18 is a heating means, such as a concentrically wound coil 21 which is connected to a not-illustrated conventional induction power supply which upon being activated supplies energy to melt a material charge, e.g. metal, to a molten state or melt, generally designated 22, which is disposed inside vessel 18.

Provision is made to provide, as required, a gas pressure P to melt 22 and in FIG. 1 this is illustrated diagramatically by an arrow and the letter P. For some practices of the invention, the material melt 22 creates an adequate static head for a molten stream flow through orifice 20 and no pressure is applied to the melt 22. In FIG. 2 the vessel 18 is provided with a removable top closure 23 which is clamped, sealed, or otherwise conventionally temporarily and removably used to close vessel 18. In FIG. 2 gas pressure, as illustrated diagramatically, is provided to melt 22 by means of a gas line 24 which extends through closure 23. Gas line 24 includes a gas meter 25 for recording the gas pressure and a valve 26 for opening and closing to admit a gas or gases from a supply source, not illustrated, through line 24 into vessel 18. The vessel 18 in FIG. 2 includes a partially diagramatically illustrated means for measuring the temperature of melt 22 with this means including a thermocouple 27 which leads to a temperature gage 28 and additional means, not illustrated, requisite for thermocouple temperature recording operation. Although not illustrated, instead of the temperature recording means just described for melt 22, one could use an optical pyrometer for observing melt temperature upon providing a quartz window or the like in top closure 23 of vessel 18.

Cup-shaped element 11, in operation of the method, contains within a quench fluid 29, generally a liquid. From centrifugal force created by rotation of shaft 12 and of its attached cup-shaped element 11, the quench fluid 29 is disposed as a rotating quenching fluid forming a wall lining and clinging to side wall 15 of cup-shaped element 11.

The FIG. 2 apparatus, designated 30, in common with the FIG. 1 apparatus 10, also includes a rotatable shaft 12 centrally affixed to a cup-shaped element 11 which contains there within a centrifugally disposed rotating quenching fluid 29, and also includes a vessel 18 having a tip 19 containing an orifice 20 and having a coil 21 for induction heating a metal charge within vessel 18 to a melt 22. In contrast to the FIG. 1 apparatus, the FIG. 2 apparatus includes for purposes explained later a small hole or opening 17' in its side wall 15. Additionally FIG. 2 apparatus 30 incorporates a containment vessel, generally designated 31, which surrounds cup-shaped element 11, and which comprises a bottom section 32, cylindrical side wall 33, and a top closure lid 34, which is adapted to hermetically seal containment vessel 31 by conventional clamping means not illustrated. Also, not illustrated and optional, but particularly useful in some practices of the process, is a means for providing and controlling a gaseous environment in the interior of containment vessel 31, which gaseous environment for some materials is an inert gas, such as argon, helium, nitrogen, or the like. In the apparatus 30 of FIG. 2, the melt vessel 18 extends upwardly through top closure lid 34 and by a conventional means, not illustrated, is adapted to be raised, lowered, and otherwise moved and located so as to place tip 19 and orifice 20 at any of numerous locations of various angles and distances from quench.fluid 29 which is disposed as a rotating quenching fluid forming a wall lining and clinging to side wall 15 of cup-shaped element 11 by centrifugal force created by rotation of shaft 12 by motor 14. In operation, shaft 12 rotates within a sleeve bearing 35 which extends through bottom section 32.

In apparatus 10 of FIG. 1 the hole or opening 17 in bottom section 13 can serve as a drain opening upon removal of screw 17a so that quench fluid 29 and formed metal particulates, after a batch operation of apparatus 10 and cessation of rotation of shaft 12, can be drained from and recovered from cup-shaped element 11 for subsequent processing to separate particulates from the quench fluid 29. In apparatus 30 of FIG. 2, the hole 17' in side wall 15 functions to permit quench fluid 29 and formed particulates to flow from cup 11 when the process is in operation. The exiting particulates may be left to collect in container 31 along with quench fluid 29 as a pool on top of section 32 until their removal and recovery are desired. Alternatively, although not illustrated, fluid 29 and particulates exiting from the opening or hole 17' can be directed onto or into a sieve-like container-ring for collection of the particulates therein with quench fluid 29 then passing through and collecting as a pool on top of bottom section 32. When particulates also collect in the pool, the quench fluid 29 is filtered therefrom before recirculation. Shown schematically is a fluid conduit 36, a pump 37, and a heat exchanger 38 so that quench fluid 29 can be removed from bottom section 32, cooled to a desired temperature which is shown on gage 39 and recirculated back inside element 11 to replenish and maintain a desired temperature and thickness of the quench fluid wall clinging by centrifugal force to side wall 15. Pump 37 is of a pumping capacity along with an appropriately sized recirculation system for fluid 29 that an adequate supply of fluid 29 may be maintained in cup 11 during operation. The size of hole 17' also is such that fluid 29 and particulates can pass through, but is kept small enough that in relation to speed of rotation of cup 11 and pumping capacity of pump 37 an adequate supply of quench fluid is maintained in cup 11.

DETAILED DISCLOSURE OF THE INVENTION

In general, the method of the invention involves adding a liquid quenchant or quenching fluid (e.g. water, oil, etc.) to the inside of the cup or drum; setting the cup in rotation at a speed effective to cause the quenchant to form a parallel layer or wall along the circumference of the cup due to the action of centrifugal force; and then squirting a molten unbroken stream of the material to be formed into particulates into this centrifugually moving wall of liquid quenchant. This results in a shearing action of the molten stream into droplets (molten particles) by the high-speed moving quenchant and a quenching of these droplets into solid particulates. The size of these particulates and their shape and nature are controllable by various variables or parameters in practice of the method, including controllable parameters, such as the employed materials, temperature of quenchant and molten material, speed of the centrifugally disposed quenching fluid, distance from, impact force and angle of contact of the molten material stream with the moving wall of quenchant, shape and size of the molten stream, and the like. The cooling rate of the formed particulates also is controllable by the just mentioned variables and can be so rapid as to provide highly desirable amphorous metal or metallic glassy particulates. Upon the molten stream being broken into droplets by high-speed moving quenchant, the droplets either immediately enter the quenchant and/or travel in free flight a very short distance before reentry into the quenchant wherein the droplets rapidly cool to solid particulates.

In comparison to other known methods of preparation of rapidly solidified particulates, this invention's method provides numerous advantages. Substantially any liquid material or any material which can be placed in a liquid state is a candidate for the quenching fluid, and particularly appropriate quenching fluids can be selected for different molten materials which are being made into particulates. The employed surface speed of the centrifugally disposed wall of the liquid quenchant can be obtained easily and also readily changed to another speed, if desired, with good control on this speed and thus extremely precise control of the particle size of the produced particulates. With laboratory apparatus, moving quenchant speeds of from about 1400 to 8000 ft./min. (~427 to 2439 m/min.) have been obtained easily and successfully employed with it contemplated that speeds of 30,000 ft./min. (9144 m/min.) and greater are obtainable and useful with appropriate apparatus. The invention's centrifugal technique appears to be less costly than prior art techniques involving high speed pumping or other movement means for quenchants. Additionally the invention's centrifugal quenchant technique can provide more than adequate coolant capacity and temperature control. Upon the molten stream being broken into droplets (molten particles or molten particulates) from contacting the moving quenchant, the molten particulates pass immediately or very quickly enter the mass of moving liquid quenchant with extremely high quenching rates being obtained. Heat transfer from the molten metal particulates to cold quenched solid particulates proceeds substantially continuously while within the liquid quenchant. In addition a major problem, associated with conventional water atomization wherein an insulating steam layer prevents further cooling, is avoided in this invention's technique because of the rapid introduction and simultaneous movement of thick layer of quenchant and the trapped particulates.

From extremely fine to much larger particulates can be produced. Some of the larger spherical particulates in an amorphous state are believed to be larger in size than preparable by any known prior art method. Process control of particulate size and/or shape is facilitated by the invention's method. To provide extremely fine spherical particles, e.g. finer than −325 mesh and in the amorphous state, high quenchant speeds (e.g. 2500 rpm. and higher or about 7500 ft./min. (2286 m./min.) and higher) are important and preferred and are a major means of size control. The molten stream size or shape, i.e. tip orifice opening is apparently the next most important process parameter towards providing desired particulates with the molten streams of smaller cross-section favoring the preparation of the extremely fine spherical particles. Particularly preferred for providing those extremely fine particles are openings of 0.010 in. (0.0254 cm.) dia. and smaller. Higher pressures on the molten material, i.e. higher molten stream pressures, also definitely favor the preparation of the extremely fine spherical amorphous particles. Particularly preferred are gas pressures on the molten material of between 2 to 10 psi. or equivalent differential pressures, so as to provide molten stream velocities of preferably about 490 ft./min. (150 m/min) and greater. To provide larger size particles and/or particles other than in the glassy state one controls the foregoing method parameters toward their opposing operable extremes, such as lower quenchant speeds (e.g. about 500 rpm or about 1450 ft./min. (442 m/min.)), larger size stream, molten metal temperature much higher than the melting point, and the like.

The employed liquid quenching fluid may be a pure liquid, a solution, a liquified gas at higher speeds or a solid-liquid dispersion or emulsion at lower speeds. The quenching fluid may be inert and chemically unreactive towards the molten material with which it is used, and generally is so. However, the invention does not exclude liquid quenching fluids, which may react with the particularly employed molten material so long as such reaction primarily is of a surface skin reaction-type or of a coating of the particulates and is not significantly deterimental to disruption and breaking up of the liquid stream upon it contacting the rapidly moving centrifugally disposed rotating liquid quenching fluid.

The choice of particular quenching fluid and its temperature is made in relation to the particularly employed molten material stream as well as other process parameters, such as the molten stream's size and force and angle of contact with the quenching fluid and also as well as the depth or thickness of and movement speed of the rapidly moving centrifugally disposed rotating liquid quenching fluid. Desirable qualities and properties for the quenching fluid are that it possess a high thermal capacity, be non toxic, be relatively non-flammable, be of low cost, and the like. For example, water is quite useful for streams of many molten materials and with molten streams whose temperatures are as high as 2200° F. (1204° C.) and higher; likewise various lower temperature aqueous salt (e.g. NaCl, $MgCl_2$, $ZnCl_2$) brines can be used with some molten materials; petroleum and synthetic oils also are useful; liquified gases are contemplated as useful; etc. Almost any liquid quenchant or quenching fluid may be used so long as it can be placed in the state of a rapidly moving centrifugally disposed roating wall-like liquid mass possessing such density and kinetic movement force so as to disrupt and break up the particularly employed molten stream of metal or alloy. Particularly useful and preferred are the following liquid quenchants for various molten materials: cold water or mixture of brine and cold water for molten Fe, Ni, and other non-reacting transition metal alloys; inert fluids such as liquid helium for reactive materials; and oils with varying quenching speeds for particles produced at varying quench rates. Of course, the foregoing merely represent typical useful quenching fluids, and a variety of alternative quench fluids also may be employed.

Although the molten stream, which is formed into particulates, herein is described and illustrated by specific examples with particularity as from a source material of a metal or metal alloy through melting the same, the invention should be and is considered operable with any material possessing properties, in the molten state at temperatures reasonably close to its melting point, similar to those of molten metals. The molten material should have, at a temperature within 25 percent of its equilibrium melting point in °K., the following properties: a surface tension in the range of from 10 to 2,500 dynes/cm, a viscosity in the range of from $10^{-3}$ to 1 poise and reasonably discrete melting point (i.e. a discontinuous temperature versus viscosity curve). The present invention is deemed operable with most metals as well as chemical compounds, and elements meeting the above criteria. In addition, the present invention is operable with metal alloys even where such alloys display a wide temperature range between the first solidification of any component within the alloy (the liquidus temperature) and the temperature at which the lowest melting point compositions solidify (the solidus temperature) yielding a completely solid material. For purposes of definition, such an alloy would be "molten" only above the liquidus temperature even though there is some molten material present at a temperature between the liquidus and solidus temperatures.

The molten stream, which is formed into particulates by the invention's method, can be from melting by conventional heating means of: a metal, for example, aluminum, zinc, lead, tin, copper and the like; or from melting a metal alloy, for example, a predominantly nickel alloy such as $Ni_{63}Cr_{12}Fe_4B_{13}Si_8$, or $Fe_{40}Ni_{40}P_{14}B_6$, and the like; or from melting metastable alloy compositions, which are known to be obtainable in the glassy or amorphous state, for example those compositions taught in U.S. Pat. No. 3,856,513 and in prior art mentioned and discussed in that patent, as well as even other metastable alloy compositions apparently not hitherto prepared in a particulate amorphous state, such as $Mg_{70}Zn_{30}$, $Ta_{60}Ir_{30}B_{10}$, $Ti_{60}Ni_{30}Si_{10}$, $Mo_{80}Ru_{10}P_{10}$, etc.

As apparent from the drawings and descriptions of the illustrated apparatus for carrying forth the method of the invention, the molten stream traverses a limited distance before contacting the rotating quenching fluid and thus also has limited exposure to the atmosphere surrounding the molten stream before breaking into particulates. Accordingly the oxidation characteristics of many metals and alloys do not limit their operability with the present invention. Materials known to be operable without the need for complete oxidation protection include the metals consisting essentially of iron, silver, nickel, tin, and zinc. Where it is desired to provide the molten stream with a particular atmosphere, then this atmosphere can be provided such as in the interior of containment vessel 31 of the FIG. 2 apparatus designated 30. The method then can be carried out in an inert atmosphere or at reduced pressure. If the molten material stream has a significant vapor pressure, the composition and pressure of the gas within the containment vessel can be manipulated so as to reduce evaporation and maintain stream integrity until the stream contacts quenchant. Also, although not illustrated, in place of the illustrated melt vessel 18 disposed as illustrated in FIG. 2, one could employ other means for heating and providing the molten material stream including placement within containment vessel 31 of the melt vessel, or of a modified melt vessel (not illustrated), adapted to utilize a heating means such as electron beam heating. Metals desirably employed with an atmosphere to reduce oxidation include those consisting essentially of titanium, columbium, tantalum, zirconium, magnesium, aluminum, and molybdenum.

For providing spherical particulates the molten stream generally is of cylindrical cross section and issues from a tapered tip having a tip orifice opening which is cylindrical. Cylindrical tip orifice openings as small as 0.005 in. (0.125 mm.) diameter are useful so long as they can be placed relatively close to the moving centrifugally maintained moving wall of liquid quenchant. Cylindrical tip orifice openings as large as 0.040 to 0.120 in. (1 mm. to 3 mm.) and larger are useful for some stream compositions providing quenchant movement is of a high enough velocity to break the molten stream into molten globules or the like. Preferred are tip openings and circular streams having a diameter between 0.005 in. (0.125 mm.) and 0.040 in. (1 mm.). Tip orifice openings and stream cross sections can be other than cylindrical.

Conventional materials are employed for construction of useful apparatuses for practice of the invention's method. For example, the ceramic melt vessel may be fabricated of quartz, silica, zirconia, magnesium oxide, beryllium oxide, boron nitride, and the like, with due consideration to avoid reaction with the molten material to be held therein as well as the temperature of the molten material and pressure placed thereon to force molten material from the tip orifice opening. The cup-shaped element, which is rotated at high speed, generally is fabricated of a metal, for example, stainless steel, aluminum, molybdenum, copper, and the like. Because of the high rotational forces to which this rotating element is subjected, care must be used in its fabrication; its construction material and fabrication must be selected with regards to providing adequate strength to withstand the forces encountered during usage; its fabrication should include a very careful dynamic balancing so as to insure uniform rotation without vibration; and desirably the employed entire apparatus is surrounded by protective safety shields, and the like.

At the conclusion of a run and removing of the mix of formed particulates and quenching fluid from the cup-shaped element or drum, the quenching fluid is separated by conventional means such as decanting, filtering, centrifuging, washing, etc. from the particulates which may be cleaned by washing, etc. and then separated by conventional means into various shapes, sizes, and classes of particulates. Useful for such separation are conventional sieves, precision sieves, roll tables, microparticle classifiers, etc.

BEST MODE OF CARRYING OUT THE INVENTION

The best mode presently known for carrying out the invention is illustrated by the foregoing description of the apparatuses in the drawings and their operation and is demonstrated in the following illustrative examples. However, since the examples are laboratory scale practices, the full benefits and advantages to be derived upon scale up to commercial practice and to commercial particulate products are expected to be of much greater value.

IN THE EXAMPLES

In the illustrative examples, which follow, there is employed a laboratory apparatus of the general description and nature of that shown in FIG. 1. The cup-shaped element of the employed apparatus is of aluminum, has an internal diameter of about 13 inches (33.0 cm.), a height of about 3-1/16 inches (7.78 cm.), and is capable of containing liquid quenchant in amounts up to 2000 ml. and more. The employed ceramic melt vessel is of quartz or Vycor ® brand silica glass depending on the specific material to be formed into particulates and is from a tube, generally of about 1 or 2 in. (2.54 or 5.08 cm.) diameter, which has been heat fabricated to close one end and at its closed end to draw a tapered tip with a tip orifice opening of the desired orifice opening size, with a number of melt vessels being fabricated and available for use with different tip orifice openings of from 0.005 to 0.03 in. (0.126 to 0.76 mm.). The top of this tube is capable of being stoppered, or closed and unclosed, with a stopper of appropriate material and through which stopper closure there is a tube which from the melt vessel leads to a gas pressure gauge and a tank source of supply of a gas such as nitrogen, argon, or the like, whose pressure is regulated by means of a valve. Melt temperature is monitored by using a chromel-alumel thermocouple. The motor means connected to the shaft, which centrally extends downward from the cup, is an electrical motor of 0.5 H.P. whose speed is variable and can be set, as desired, at a steady speed by the electrical input thereto which electrical input is regulated by a controller. The induction coil heater for the ceramic melt vessel comprises 0.25 in. (0.64 cm.) copper tubing and a 30 KW induction generator.

Procedurally the desired amount of liquid quenchant is placed in the cup-shaped element and the element rotated at a low speed (generally greater than 200 rpm) adequate to immediately position the quenchant as a centrifugally disposed ring of liquid clinging to the inner wall of the cup-shaped element. A quantity of the employed material (e.g. metal or alloy) to be formed into particulates is placed in the silica or quartz melt vessel which is positioned with its tip orifice opening at the desired distance and angle from the centrifugally disposed ring of liquid quenching fluid. A heating means, such as an induction heater is activated to melt the metal or alloy in the silica melt tube and to bring the molten material to a desired temperature, frequently at least about 200°-300° F. (93° to 149° C.) higher than its melting point. The cup-shaped element then is set in rotary motion at the desired speed, frequently a speed of 1500 to 10,000 rpm. The desired gas pressure, e.g. 2-10 psi, is imposed on the molten metal and molten metal flows as an unbroken stream from the tip orifice opening to contact the rapidly moving centrifugally disposed ring-like wall of quenching fluid and upon such contact to be broken from a stream into particulates some of which immediately enter and remain in the quenchant and other particulates which within a very short distance enter the quenchant. Within the quenchant, the particulates are subjected to extremely rapid cooling of an order requisite to provide particulates of a glassy or other metastable or crystalline form depending on the size of the particle which in turn depends on the velocity of the quenching fluid and molten stream cross-section.

EXAMPLE A

Greater than 99 percent pure tin powder is melted in a melt vessel and brought to a temperature of 550° F. (287.8° C.). Under an argon gas pressure of 5 psi the molten tin is forced through a 0.014 in. (0.35 mm.) tip orifice opening as a stream directed substantially perpendicular (at 90° to the tangent, i.e. normal) to and at a distance of between 3 to 4 in. (7.6 to 10.2 cm.) onto a centrifugally disposed wall of quenching fluid, which is composed of 1000 ml. of a heavy duty automotive vehicle petroleum oil (such as Mobil 10W40). The rapidly moving centrifugally disposed wall of liquid oil is maintained in its centrifugal disposition by rotation of the cup-shaped element at 2100 rpm. After all the molten tin in the melt vessel has been streamed into contact with the moving oil quenchant, the run is stopped and a mixture of particulates and oil are removed from the apparatus. Oil is washed from the particulates with trichloroethylene washes and the washed particulates air dried, e.g. in a warm 150° F. (65.6° C.) oven, and then subsequently sieved through a series of sieves (U.S. Sieve Series). Particulates retained on the No. 50 screen are substantially all flakes with greater than 50 percent by weight of all particulates passing through No. 50. Those passing through No. 50 and retained on No. 100 are a mixture of flakes and powder, those passing through a No. 100 and retained on No. 230 are apparently all spherical powder-like particulates, and those retained on a No. 325 are spherical powder-like particulates.

EXAMPLE B

Additional preparations are made of solid particulates from molten tin. These preparations are made at a variety of process parameters including: molten tin temperatures of 900° F. (482.2° C.), 825° F. (440.6° C.), and 850° F. (454.4° C.); the molten tin under argon gas pressure of 5 psi.; tip orifice openings of 0.014 in (0.36 mm.) and 0.015 in. (0.38 mm.); stream distances from orifice openings to moving centrifugally disposed wall of liquid quench fluid of ⅝ in. (1.6 cm.) and about 1 in. (2.54 cm.); with quench fluids of auto vehicle petroleum oil, water, and a quench oil for metal heat treating, such as Houghton K-oil which is of a mineral oil base containing an oxidation inhibitor and which meets Military Specification MIL-H-6875D; rotating cup and quench fluid speeds of 1900, 2100, and 2500 rpm; and with molten tin streams contacting the quench fluid in directions of substantially perpendicular to the tangent of the moving centrifugally disposed wall of quenchant as well as at an acute angle with the away movement of the quenchant and at an acute angle with the approaching moving quenchant.

In each of these runs solid particulates were prepared. In runs at the close stream distance of ⅝ inch and also at the molten stream acute angle with the approaching moving quenchant, difficulties were encountered in keeping tin from solidifying in and clogging the tip opening so as to be able to conduct runs of extended duration. A general trend was noted at higher molten tin temperatures and at the higher quenchant speeds of preparing greater yields of particulates of −325 No. sieve sizes and of favoring substantially spherical particulates being produced.

EXAMPLE C

Solid particulates are prepared from molten 2826 alloy, which consists essentially of $Fe_{40}Ni_{40}P_{14}B_6$. The molten alloy at a temperature of about 2300° F. (1260° C.) is streamed from a 0.014 in. (0.356 mm.) diameter opening for a distance of about 1 inch (2.54 cm.) at a direction normal to and into about 2000 ml. of oil moving as a centrifugally disposed wall of quenchant in the cup-shaped element rotating at 2500 rpm.

EXAMPLE D

Solid particulates are prepared from molten lead of a temperature of about 750° F. (399° C.). The molten lead is from a 0.015 in. (0.38 mm.) diameter orifice and is streamed about 1 in. at an about perpendicular (i.e. normal) direction into about 2000 ml. of water moving as a centrifugally disposed wall of quenchant in the cup-shaped element rotating at about 2500 rpm. The produced particulates appear to have an oxide coating.

EXAMPLE E

Solid particulates are prepared from a nickel-base 915 alloy, which consists essentially of $Ni_{63}Cr_{12}Fe_4B_{13}Si_8$. The molten alloy at a temperature of about 2200° F. (1204° C.) and under an argon gas pressure of 10 psi. is streamed through a 0.01 in. (0.25 mm.) diameter tip orifice opening for about 1 in. (2.54 cm.) at about perpendicular direction into about 1500 ml. of water moving as a centrifugally disposed wall of quenchant in the cup-shaped element rotating at about 2500 rpm. There is produced a mixture of solid particulates of flakes, fibers, and non-spherical to substantially spherical shape. Some fibers of about 1μ diameter are noted to have one enlarged or bulbous-type end. Some particulates are noted to be of a metallic glassy structure and other particulates are noted to possess crystalline structure.

EXAMPLE F

Additional preparations are made of solid particulates from the same nickel-base alloy employed in Example E. These preparations included the employing of 1000 ml. and 2000 ml. of water as the liquid quenchants. Other preparations employed 2000 ml. of petroleum oil as the liquid quenchant. With petroleum oil as the liquid quench fluid and the molten nickel alloy stream directed at about a 45° angle to the moving away centrifugally disposed wall of oil quenchant, the produced particulates were substantially all near spherical to spherical with very little to no fiber particulates noted. With 1000 ml. of water as the liquid quench fluid and the molten stream from an 0.005 in. (0.127 mm.) orifice opening and 10 psi pressure directed about perpendicular to the moving centrifugally disposed wall of water, the size distribution of the produced particulates is 1.6 percent by weight +50, 6.2 percent by weight −50 to +70, 16.6 percent by weight −70 to +100, 66.7 percent by weight −100 to +230, 7.3 percent by weight −230 to +325, and 1.6 percent by weight −325 (U.S. Sieve Series).

EXAMPLE G

Solid particulates are prepared from aluminum alloy 2024, which consists essentially in weight percent of 4.4% Cu, 1.5% Mg, 0.6% Mn, and balance Al. The molten alloy at a temperature of 1400° F. (760° C.) is streamed at about a perpendicular direction into 2000 ml. of water moving as a centrifugally disposed wall of quenchant in the cup-shaped element rotating at about 2500 rpm. The produced particulates predominantly are of irregular shape and observed to be of very fine dendritic structure.

As is apparent from the foregoing illustrative examples, solid particulates of flake, fiber, spherical and irregular shapes and of various sizes can be prepared from a diversity of materials in their molten state. For example, water as the quenchant favors fiber and sphere particulate formation, while oil as the quenchant favors production of particulates predominantly spherical or near spherical particulates. These shapes and sizes subsequently are separable and classifiable, as desired, into various fractions of particular shape and/or range of sizes. These particulate fractions find utility in many applications, such as in powder metallurgical applications wherein they can be consolidated by conventional techniques into useful articles, or they can be used as a feed stock powder for plasma spraying, or as elemental or alloy powder for the preparation of alloys otherwise difficult to made by conventional means, or fiber particulates can be used in magnetic tapes, and the like.

The produced particulates and fractions thereof also can be categorized into groups based on structure, namely those exhibiting a crystalline state and those exhibiting an amorphous state. The amorphous state is the non-crystalline or glass phase and generally is obtainable by an extremely rapid quenching technique. As is recognized in the art, various physical and chemical properties, which depend on atomic arrangement are uniquely different for the crystalline and amorphous states. For many applications the properties possessed by amorphous particulates are desirable and useful. Generally though one distinguishes between the two states by means other than by their physical properties, such as their strength and ductility and their magnetic and electrical properties. X-ray diffraction measurements are most often used to distinguish a crystalline from an amorphous state. An amorphous substance reveals a diffraction pattern with broad peaks, somewhat similar as observed in a liquid, while the crystalline state produces much more sharper peaks in the diffraction pattern. Also it can be noted that the cooling from a molten state to the amorphous state resembles an almost continuous solidification over a range of temperature without a discontinuous evolution of a heat of fusion. On the other hand in proceeding to the crystalline state, crystallization is a thermodynamic first order transition and is associated with a heat of fusion and a specific temperature. Thus, the metastable amorphous state will convert to the crystalline form upon heating to requisite sufficiently high temperature with evolution of a heat of crystallization. In some instances there are produced particulates which exhibit desirable properties possessed by the amorphous state substance, yet the substance still may be partially crystalline. Generally the fraction or proportion of such a substance that is partially crystalline can be estimated through employment of X-ray or electron diffraction, electron transmission microscopy and thermal analysis upon comparison of these measurements with comparable measurements made of the completely crystalline and amorphous states.

With reference to the preceding examples employing $Ni_{63}Cr_{12}Fe_4B_{13}Si_8$ alloy, it is known in the art that this Ni-base alloy is a conventional brazing alloy which can be rapidly solidified in amorphous form by a strip casting technique. In the preceding illustrative examples with this alloy there were produced fibers and spherical particulates. Mixtures of these two shapes are separated and classified using a Bahco microparticle classifier, then the roll table, and then precision sieves to provide narrow size fractions. For characterization purposes these fractions then are subjected to optical metallaography, DSC (Differential Scanning Colorimeter), and X-ray diffraction examinations.

Etched micrographs of these Ni-alloy particulates of size 46–50μ are prepared and examined. In the case of the fibers, optical metallography revealed no structure indicating that the material is in the amorphous form, but in the case of spherical particles, while most are impervious to etching, a few do show crystalline structure indicating some crystallinity. Spherical particulates of size 88–89μ also show a similar presence of a few particulates having crystalline structure. It is possible that this presence of particulates of both amorphous and crystalline structures is explainable as resulting from an observed two different quenching mechanisms—one, those molten droplets which formed from disruption of the molten stream remaining in the moving centrifugally disposed wall of quenchant to immediately rapidly cool and solidify; and of two, those molten droplets formed from the disruption of the molten stream streaming slightly for a very short distance before reentry into the moving centrifugally disposed wall of quenchant to then rapidly cool and solidify.

The just-mentioned size fractions of fiber and spherical particulates from this Ni-base alloy also are investigated by DSC using a Perkin Elmer DSC-2 to provide thermograms thereof. In all instances for both fiber and spherical particulates and for both size fractions there was observed a distinct amorphous to crystalline transformation peak, and for each namely Tx of 710° K. The 46–50μ spherical particulates gave a ΔHx of 2.1 cal./gm. and the 88–90μ spherical particles gave a ΔHx of 1.6 cal./gm. ΔHx is the heat energy released during crystallization.

An X-ray diffraction pattern is made of the spherical particles of a 63–149μ size produced from this Ni-base alloy. The pattern correlates with the optical metallography observations of a mixture of amorphous with some crystalline particulates with the pattern presenting a broad amorphous background and some sharp crystalline peaks due to some crystalline particulates.

It is noteworthy that spherical particulates produced from this Ni-base alloy of a size as large as 0.008 in. (0.12 mm.) dia. are produced in a metallic glassy phase.

Particulates produced in the preceding Example employing Al-base alloy (2024) also were examined. Under optical metallographic techniques, the produced nearly spherical particulates in an etched micrograph revealed a very small grain size indicative of rapid quenching. The micrograph also shows islands of dentritic structure, indicating within the same particle that the cooling rates had differed. The microstructure is the same as that obtained by a Lebo-Grant splat quenching technique wherein the stream of molten alloy impinges on a copper wall and wherein they indicated attaining a cooling rate of $10^6$ °K./sec. DSC examination of 46–50 μm size spherical particulates of this Al-base alloy failed to reveal any transformation from the microcrystalline phase to either solutionize or precipitate when heated up to 500° C.

We claim:

1. A method of preparing solid particulates comprising the steps of
    (a) heating a solid material to a molten state adapted to provide a molten unbroken stream of the material which at a temperature within 25 percent of its equilibrium melting point in °K. has a surface tension in the range of 10 to 2500 dynes/cm. and a viscosity in the range of 0.001 to 1 poise; and
    (b) flowing the molten unbroken stream into contact with a moving wall of a centrifugally disposed rotating liquid quench fluid in a manner adapted to subdivide the molten stream and to quench into solid particulates within the quench fluid.

2. The method of claim 1 including a subsequent step of separating and recovering the solid particulates from the quench fluid.

3. The method of claim 2 including a subsequent step of cooling of quench fluid with a recirculation thereof for contacting by the molten stream.

4. The method of claim 1 in which the moving wall of said quench fluid is at a speed between about 140 to 30,000 ft./min.

5. A method for preparing metal particulates, which method comprises:
    (a) contacting a molten stream of metal or metal alloy, which at a temperature within 25 percent of its equilibrium melting point in °K. has a surface tension in the range of 10 to 2500 dynes/cm. and a viscosity in the range of 0.001 to 1 poise, and a moving wall of a centrifugally disposed rotating liquid quench fluid in a manner adapted to disrupt said stream with breaking of the stream into molten particles and to quench into solid particulates; and
    (b) separating and recovering the solid particulates from the quench fluid.

6. The method of claim 5 in which the molten stream is at a temperature of between 10° C. to 100° C. above the liquidus temperature of the metal or metal alloy.

7. The method of claim 6 in which the moving wall of the centrifugally disposed rotating liquid quench fluid is moving at a velocity of at least 7500 ft./min.

8. The method of claim 7 employing water as said liquid quench fluid.

9. The method of claim 7 employing an oil as said liquid quench fluid.

10. A method of making solid particulates from normally solid metal or metal alloy, which comprises the steps of:
    (a) melting said metal or metal alloy and providing a molten stream thereof, which at a temperature within 25 percent of its equilibrium melting point in °K. has a surface tension in the range of 10 to 2500 dynes/cm. and a viscosity in the range of 0.001 to 1 poise;
    (b) providing a moving cylindrical ring-like mass of a centrifugally disposed rotating liquid quench fluid;
    (c) directing the molten stream into contact with a moving wall of the moving cylindrical ring-like mass of the centrifugally disposed rotating liquid quench fluid in a manner adapted to disrupt the molten stream and with breaking of the stream into molten particles and with cooling by said centrifugally disposed rotating quench fluid of the molten particles to solid particulates; and
    (d) separating and recovering the solid particulates from the liquid quench fluid.

11. The method of claim 10 employing a metal alloy and adapted to provide a significant amount of solid spherical particulates in a metallic glassy state.

12. The method of claim 11 in which the moving cylindrical ring-like mass is moving at a velocity of at least 7500 ft./min. and the molten stream is at a temperature between 10° C. and 100° C. above the melting point of the employed metal alloy.

13. The method of claim 10 in which the stream is of a diameter less than about 0.04 in.

14. The method of claim 10 employing tin for the solid metal.

15. The method of claim 10 employing a nickel-base alloy for the solid metal alloy.

16. The method of claim 10 employing water for said liquid quench fluid.

17. The method of claim 10 employing an oil for said liquid quench fluid.

18. The method of claim 10 employing a gas pressure for forcefully directing the molten stream.

19. The method of claim 10 in which following the separating and recovering there is performed a size classification providing spherical and fiber fine-sized solid particulates of a metallic glassy structure.

20. The method of claim 10 in which quench fluid is removed, cooled and returned to said moving cylindrical ring-like mass to maintain said mass at a desired temperature.

21. The method of claim 10 in which the directing of the molten stream into said contact includes passage of the molten stream through an inert gaseous environment.

* * * * *